United States Patent
Delahaye et al.

(10) Patent No.: US 10,477,264 B2
(45) Date of Patent: Nov. 12, 2019

(54) EXTRACTION OF VIDEO STREAMS

(71) Applicant: SQUADEO, Marly le Roi (FR)

(72) Inventors: Nicolas Delahaye, Marly le Roi (FR);
Francois Martin, Marly le Roi (FR);
Ludovic Piquet, Marly le Roi (FR);
Frédéric Pasquet, Marly le Roi (FR);
David Grondin, Marly le Roi (FR)

(73) Assignee: Squadeo, Marly-le-Roi (FR)

( * ) Notice: Subject to any disclaimer, the term of this patent is extended or adjusted under 35 U.S.C. 154(b) by 0 days.

(21) Appl. No.: 15/481,668

(22) Filed: Apr. 7, 2017

(65) Prior Publication Data

US 2017/0295398 A1 Oct. 12, 2017

(30) Foreign Application Priority Data

Apr. 8, 2016 (FR) ..................................... 16 53150

(51) Int. Cl.
*H04N 21/435* (2011.01)
*H04N 21/234* (2011.01)
(Continued)

(52) U.S. Cl.
CPC ....... *H04N 21/4353* (2013.01); *H04N 21/234* (2013.01); *H04N 21/2387* (2013.01);
(Continued)

(58) Field of Classification Search
CPC ........... H04N 21/234; H04N 21/23439; H04N 21/2387; H04N 21/26258; H04N 21/4353;
(Continued)

(56) References Cited

U.S. PATENT DOCUMENTS 9,148,642 B2* 9/2015 Alexander ........... G11B 27/005
9,621,522 B2* 4/2017 Kiefer ................... H04L 9/0819
(Continued)

FOREIGN PATENT DOCUMENTS

CN 102 594 773 A 7/2012

OTHER PUBLICATIONS

French Application No. 1653150, Preliminary Search Report dated Dec. 2, 2016, 8 pages.
(Continued)

*Primary Examiner* — Thai Q Tran
*Assistant Examiner* — Stephen R Smith
(74) *Attorney, Agent, or Firm* — Patterson Thuente Pedersen, P.A.

(57) ABSTRACT

A method for the selective extraction, by a terminal, of at least one image to be extracted, from an encrypted video stream where multiple encrypted versions are stored on a server incapable of decrypting the encrypted version. The multiple encrypted versions comprising at least a low resolution version and a high resolution version, and each encrypted version is divided into encrypted blocks, containing multiple encrypted images. The method includes selecting an encrypted block from the low resolution encrypted version of the encrypted video stream, selecting a subset of the encrypted block containing an image to be extracted; transmitting to the terminal the subset; decrypting of the subset by the terminal; and extracting the image, from the decrypted subset.

9 Claims, 3 Drawing Sheets

(51) Int. Cl.
*H04N 21/2387* (2011.01)
*H04N 21/4405* (2011.01)
*H04N 21/472* (2011.01)
*H04N 21/6587* (2011.01)
*H04N 21/2343* (2011.01)
*H04N 21/262* (2011.01)
*H04N 21/61* (2011.01)
*H04N 21/6377* (2011.01)
*H04N 21/845* (2011.01)

(52) U.S. Cl.
CPC . *H04N 21/23439* (2013.01); *H04N 21/26258* (2013.01); *H04N 21/4405* (2013.01); *H04N 21/47202* (2013.01); *H04N 21/47217* (2013.01); *H04N 21/6125* (2013.01); *H04N 21/6377* (2013.01); *H04N 21/6587* (2013.01); *H04N 21/8455* (2013.01); *H04N 21/8456* (2013.01)

(58) Field of Classification Search
CPC ......... H04N 21/4405; H04N 21/47202; H04N 21/47217; H04N 21/6125; H04N 21/6377; H04N 21/6587; H04N 21/8455; H04N 21/8456
USPC .......... 386/259, 343, 346, 351; 725/90, 102
See application file for complete search history.

(56) References Cited

U.S. PATENT DOCUMENTS

| | | | | |
|---|---|---|---|---|
| 9,781,451 B2* | 10/2017 | Martin | ................... | H04N 19/46 |
| 2009/0178090 A1* | 7/2009 | Oztaskent | .......... | H04N 7/17336 |
| | | | | 725/90 |
| 2013/0007223 A1 | 1/2013 | Luby et al. | | |
| 2014/0003516 A1* | 1/2014 | Soroushian | ........ | H04N 21/2387 |
| | | | | 375/240.13 |
| 2014/0237520 A1* | 8/2014 | Rothschild | ........... | H04N 21/236 |
| | | | | 725/88 |
| 2014/0359679 A1* | 12/2014 | Shivadas | ............ | H04N 21/8455 |
| | | | | 725/90 |
| 2016/0165173 A1* | 6/2016 | Lesh | ..................... | H04N 5/783 |
| | | | | 386/241 |
| 2016/0307596 A1* | 10/2016 | Hardin | ................... | H04L 65/40 |
| 2018/0014041 A1* | 1/2018 | Chen | ................. | H04N 21/2347 |

OTHER PUBLICATIONS

Notification selon l'Article 94(3) CBE for Application No. EP 17165587.1, dated Sep. 26, 2018 (12 pgs). No translation available.

* cited by examiner

EXTRACTION OF VIDEO STREAMS

RELATED APPLICATIONS

The present application claims the benefit of French Application No. 1653150 filed Apr. 8, 2016, which is incorporated herein by reference in its entirety.

FIELD OF THE INVENTION

The description relates to the field of video content distribution.

BACKGROUND OF THE INVENTION

VCRs (which recorded and read movies on magnetic tapes) included a fast forward or fast reverse function. To achieve this, an electric motor was rotated to wind the magnetic tape at a higher speed, and where appropriate, the direction of rotation of this electric motor was reversed.

Now videos are often stored on servers connected to terminals (personal computers, laptop computers, tablets, mobile phones, etc.). These terminals allow viewing the videos by streaming them. The terminals and servers can have significant storage capacity and computing power, but the available bandwidth between terminal and server often constitutes a bottleneck.

Servers that store video streams are generally distribution servers, which essentially store encrypted video streams and transmit them on demand but which are incapable of decrypting these video streams and more particularly of extracting targeted information from them. They do not have the cryptographic keys required to perform such decryption (intentionally, for security reasons). The cryptographic keys for decryption are usually supplied directly to the terminals by other servers (known as DRM servers) which, after authentication of a terminal and verification of its access rights, communicate to the terminal the information it requires to decrypt the video stream received from a distribution server. This required information is not necessarily the cryptographic key itself, but may be information from which the terminal is able to calculate the cryptographic key.

In such a scheme, in order to fast forward, it would seem natural to download the video stream at a faster rate, but often the available bandwidth does not allow this. Even when the bandwidth allows for example tripling the speed of the download to enable streaming accelerated by a factor of three, this is unsatisfactory because it represents a waste of bandwidth.

Another difficulty also arises. In order to move forward or back in a video stream in an informed and relevant way, it is useful to have an approximate representation of the content of the video stream. However, to construct this approximate representation, it is necessary to access elements scattered through the entire video stream (from the beginning to the end of the video stream).

It has been proposed to provide a strip containing scenes representative of the complete video, for example one image per minute, to enable a user to find the desired position in the video stream and click directly on the image corresponding to the scene of interest. This is what Google does for example in its Youtube service. The server is then adapted to generate an image containing a series of miniature images corresponding to different moments in the video stream. As for the company Apple, it has developed a technology called HLS ("HTTP live streaming"). This technology allows the server to generate representative images from a video stream and to transmit them on request. But in either case, it is necessary to have sufficient control over the distribution server (which must be modified to add the required functionalities). Above all, if the video stream is encrypted, it is necessary to be able to decrypt the video stream at the server, which is often not possible and is often not desirable for security reasons.

It might seem conceivable to transmit only a portion of the video stream (for example one image out of three), but this solution is not considered because the distribution server does not know how to access the images in the video stream, which are encrypted. In addition, it is insufficient to identify one image out of three and transmit it, because the images are compressed and some images are not self-contained (cannot be decompressed without additional information).

More specifically, it is common for the videos to contain three types of images, called I images, B images, and P images.

I images are self-contained images, in the sense that they are compressed (for example with an algorithm such as the JPEG algorithm) without considering the images that surround them. Such I images are useful for video streams which can be viewed mid-stream (without starting from the beginning), for example video streams relating to events filmed live. For example, there are typically one or two I images per second in a H264 video.

P images are defined by their difference from the previous image. As consecutive images are generally similar, this increases the compression rate. However, an image can only be decompressed in the presence of the previous image, which must be included (otherwise, the decompressed image is incorrectly reconstructed).

Finally, B images are even more compressed (at equivalent quality) because they can make use not only of the previous image but also of the following image. This adds latency, since decompression of a B image requires having received the following image as well. It also requires storing three images in memory (the previous one, the current one, and the next one).

In practice, a video stream comprises a sequence of images alternating between these different types of images I, P, B, for example in the order IBBPBBPBBPBBI. Other types of images and image sequences are possible, but in most implementations, not every image of the video stream is self-sufficient from a decompression point of view (only some are).

In addition, the image size fluctuates. Some images are easier to compress than others, and by definition a heavily compressed image has a smaller size than an uncompressed image.

Since the structure of a video stream is complex and the video stream is encrypted, it has not appeared possible to perform the relevant extractions.

Various techniques have been proposed for solving similar or related problems and are described in particular in patent applications US 2006/0288392 A1, US 2013/0097508 A1, US 2014/0282262 A1, and US 2002/0075572 A1, or in the article "Swift: Reducing the Effects of Latency in Online Video Scrubbing", by Justin Matejka, Tovi Grossman, George Fitzmaurice, CHI '12, May 5-10, 2012, Austin, Tex., USA. However, none of these solves the above problems in a satisfactory manner. The invention aims to improve the situation.

SUMMARY OF THE INVENTION

One aspect of the invention relates to a method for the selective extraction, by a terminal, of at least one image to be extracted contained in an encrypted video stream, multiple encrypted versions of said encrypted video stream being stored on a server incapable of decrypting said encrypted versions of the video stream, said multiple encrypted versions comprising at least a low resolution version and a high resolution version, each encrypted version of said encrypted video stream being divided into encrypted blocks, each encrypted block containing multiple encrypted images, said method comprising:

selection of an encrypted block from the low resolution encrypted version of the encrypted video stream, said encrypted block containing an image to be extracted;

selection of a subset of said encrypted block containing said image to be extracted;

transmission, by the server to the terminal, of said subset;

decryption of said subset by the terminal;

extraction by the terminal, of said image to be extracted, from said decrypted subset.

"High resolution version" is understood to mean a version of the video stream preferably sent to the terminal for viewing the associated video content.

"Low resolution version" is understood to mean a version corresponding to a lower resolution than the "high resolution version". In particular and in a non-limiting manner, the low resolution version chosen for extraction of the blocks may be the version corresponding to the lowest resolution among all the resolutions stored on the server.

Such a method is advantageous in that it permits extraction of the relevant parts from an encrypted video stream stored on a distribution server in order to fast forward (or fast rewind) and in order to construct a set of thumbnails (images of reduced size) representative of the entire video stream, in the manner of an automatically generated table of contents. The extraction enables downloading only a small proportion of the entire video stream, which in addition is low resolution, and thus only requires a small amount of bandwidth.

An approximate representation of the entire video content can be obtained quickly in this manner. The user can then move about in the video in a relevant manner.

The method according to the invention may comprise one or more of the following characteristics, alone or in combination.

One aspect of the invention relates to a method for selective extraction comprising, after extraction of said image to be extracted from said decrypted subset, transmission from the terminal to the server of the size of the encrypted image to be extracted.

One aspect of the invention relates to a method for selective extraction comprising a selection, by the terminal, of all the encrypted blocks of said low resolution encrypted version of the encrypted video stream.

One aspect of the invention relates to a method for selective extraction comprising a selection, for each selected encrypted block, of a single subset containing a single image to be extracted for said selected encrypted block.

One aspect of the invention relates to a method for selective extraction wherein the selected single subset for a selected encrypted block starts at the beginning of said selected encrypted block.

One aspect of the invention relates to a method for selective extraction wherein the size of said selected subset defaults to a predetermined size.

One aspect of the invention relates to a method for selective extraction wherein each selected encrypted block comprises only two images to be extracted.

One aspect of the invention relates to a method for selective extraction comprising a concatenation, by the server, of multiple selected subsets, and a transmission of said concatenated subsets by the server to the terminal within a single packet.

One aspect of the invention relates to a computer program comprising a series of instructions which, when executed by at least one processor, implement a method according to an embodiment of the invention.

One aspect of the invention relates to a non-transitory computer-readable storage medium, storing a computer program according to an embodiment of the invention.

One aspect of the invention relates to a terminal arranged for selective extraction of at least one image to be extracted contained in an encrypted video stream, multiple encrypted versions of said encrypted video stream being stored on a server incapable of decrypting said encrypted versions of the video stream, said multiple encrypted versions of said encrypted video stream comprising at least a low resolution version and a high resolution version, each encrypted version of said encrypted video stream being divided into encrypted blocks, each encrypted block containing multiple encrypted images, said terminal comprising:

an electronic circuit for selecting an encrypted block of the low resolution encrypted version of the video stream, said encrypted block containing at least one image to be extracted;

an electronic circuit for selecting a subset of said encrypted block containing said image to be extracted;

an electronic circuit for receiving said subset from the server;

an electronic circuit for decrypting said subset;

an electronic circuit for extracting said image to be extracted from said decrypted subset.

One aspect of the invention relates to a server arranged for storing multiple encrypted versions of an encrypted video stream, said server not being able to decrypt said encrypted versions of said encrypted video stream, said multiple encrypted versions of said encrypted video stream comprising at least a low resolution version and a high resolution version, each encrypted version of the video stream being divided into encrypted blocks, each encrypted block containing multiple encrypted images, said server comprising:

an electronic circuit for selecting an encrypted block from the low resolution encrypted version of the encrypted video stream, said encrypted block containing an image to be extracted;

an electronic circuit for selecting a subset of said encrypted block containing said image to be extracted;

an electronic circuit for transmitting said subset to a terminal.

BRIEF DESCRIPTIONS OF THE DRAWINGS

Other features and advantages of the invention will become apparent from reading the following description. This is purely illustrative and should be read with reference to the accompanying drawings in which.

The following embodiments are examples. Although the description refers to one or several embodiments, this does not necessarily mean that each element mentioned in the context of an embodiment relates only to that particular embodiment, or that features of that embodiment apply only to that embodiment.

DETAILED DESCRIPTION OF THE DRAWINGS

Figure 1:
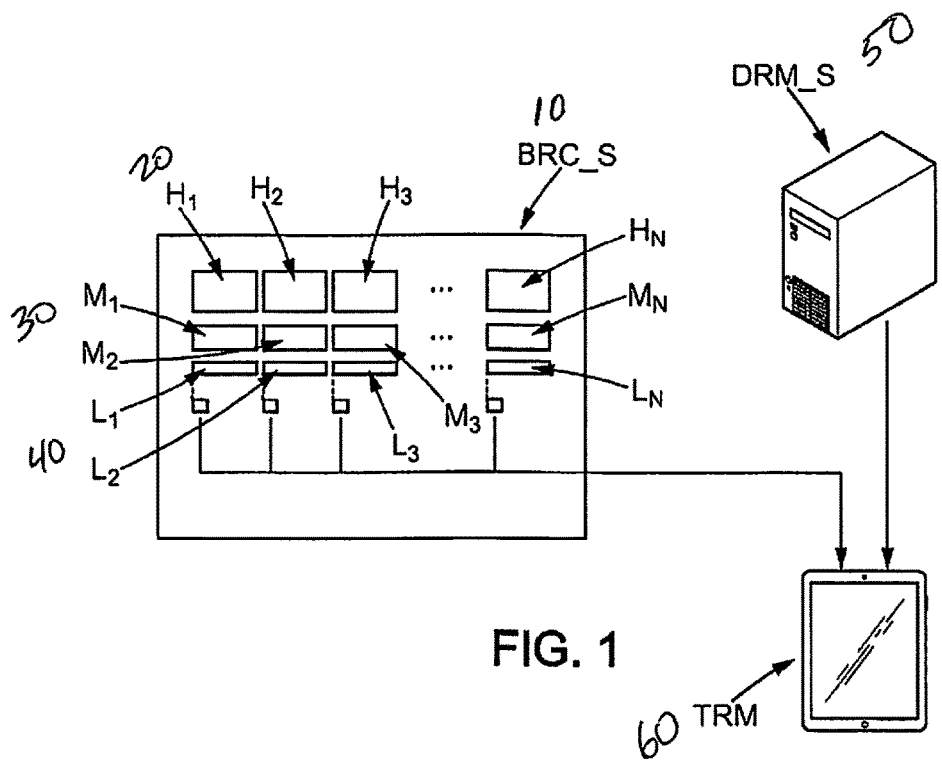
FIGS. 1 to 4 represent streaming servers according to various embodiments of the invention, cooperating with a digital rights management server as well as with a terminal according to various embodiments of the invention.

FIG. 1 represents an embodiment according to the invention in which a video streaming server BRC_S 10 stores a multitude of video streams of which only one is represented. The streaming server BRC_S 10 is represented in a schematic and functional manner. The video stream represented is stored in three versions: high quality (for example with a resolution of 1920 by 1080 pixels per image), medium quality (for example with a resolution of 640 by 480 pixels per image), and low quality (for example with a resolution of 320 by 200 pixels per image). The three streams are identical, aside from their quality. Resolution is often the most important parameter for quality. However, the quality of the streams may result in particular from their resolution (examples cited above), their depth (each pixel being coded in more or fewer bits before compression, for example in 4,294,967,296 colors (32 bits), 16,777,216 colors (24 bits), or 65,536 colors (16 bits)), their framerate (more or fewer images per second), their compression ratio, or a combination of two or more of the above parameters (resolution, depth, framerate, and compression ratio). However, a stream of lower quality has a lower bitrate and is therefore faster to transmit (it can be transmitted using less available bandwidth than would be required for a higher quality transmission). This makes it possible to implement an ABR (Adaptive Bit Rate) algorithm, in which the transmitted stream is adapted to the available bandwidth. The transmitted quality is worse when the bandwidth drops and better when it improves, which avoids any interruption in the streaming (at the cost of temporarily degraded quality). The high resolution stream is composed of blocks 20 ($H_1, H_2, H_3 \ldots H_N$). The medium resolution stream is composed of blocks 30 ($M_1, M_2, M_3 \ldots M_N$). The low resolution stream is composed of blocks 40 ($L_1, L_2, L_3 \ldots L_N$). Each block ($H_1 \ldots H_N, M_1 \ldots M_N, L_1 \ldots L_N$) of each of the three streams comprises, for example, approximately 10 seconds of video, which is approximately 250 images. The 250 images of block L1 take much less memory than the 250 images of block H1.

Each block ($H_1 \ldots H_N, M_1 \ldots M_N, L_1 \ldots L_N$) of each of the three streams is encrypted. The streaming server BRC_S 10 does not have access to cryptographic keys enabling decryption of the blocks ($H_1 \ldots H_N, M_1 \ldots M_N, L_1 \ldots L_N$).

A terminal TRM 60 on which the video stream is to be played must therefore obtain a decryption key from a digital rights management server DRM_S 50 (or even several decryption keys if this key changes during streaming). It can then download the video stream (preferably all the blocks $H_1, H_2, H_3 \ldots H_N$, but possibly lower resolution blocks when the bandwidth is insufficient), which it does for example progressively as it plays said video stream.

In order to allow moving about in the video stream, the terminal requires the transmission of the start of each block ($L_1, L_2, L_3 \ldots L_N$) as soon as possible. For example, it requests from the streaming server the transmission of the first 5% of each block. In principle, the first image of the block is a type I image, and it occupies about 2% of the block. Thus, obtaining 5% of the block ensures that this image can be decoded even if the image occupies slightly more than 2%. The terminal TRM 60 can decrypt the received 5% as if decrypting the entire block, then can stop as soon as it has succeeded in extracting the type I image. The indicated percentages may vary depending on the algorithms and protocols used.

Thus, even though the streaming server BRC_S 10 cannot even partially decrypt the content of the blocks, a relevant image is obtained by downloading only 5% of the block, which in addition is a low resolution version that is faster to download than the high resolution version. This makes it possible to obtain an approximate representation of the entire video fairly quickly and to change the viewing location within the video in a relevant manner.

The streaming server BRC_S 10 does not need to carry out substantial additional processing (in terms of computation time) compared to a server BRC_S of the prior art.

Figure 2:
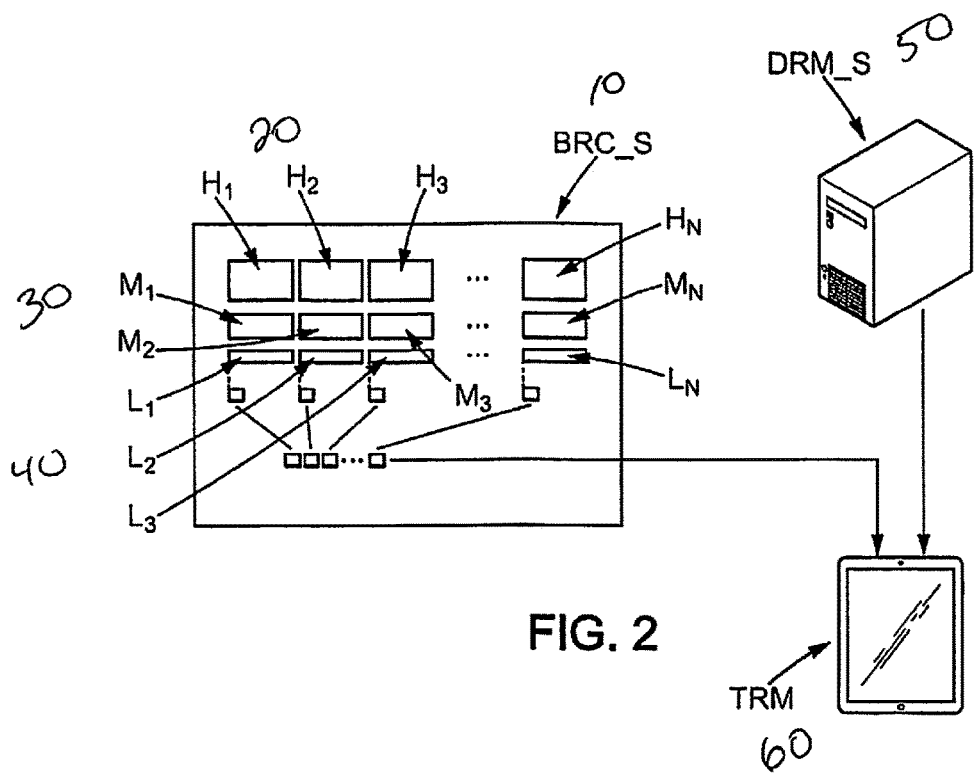

FIG. 2 represents an embodiment according to the invention in which a video streaming server BRC_S 10 stores a multitude of video streams, of which only one is represented. Similarly to FIG. 1, the video stream represented is stored in three versions: high resolution, medium resolution, and low resolution respectively.

Instead of transmitting the beginning of each of the blocks $L_1, L_2, L_3 \ldots L_N$ as they are requested, the streaming server BRC_S 10 groups these block beginnings into a single packet which it transmits all at once. According to one possible implementation, in addition to concatenating the block beginnings, the streaming server BRC_S 10 adds to the metadata packet in order to help the terminal find each block beginning in the packet. Alternatively, the terminal TRM 60 knows where the block beginnings are located, without the need to provide metadata. For example, the block beginnings may have a predefined size.

According to one possible implementation, the streaming server BRC_S 10 stores the packet containing the concatenated block beginnings in a file, which it references in a main playlist file. This file can thus be precalculated and then be immediately available for download when a terminal TRM 60 selects the video stream in question.

This concatenation avoids the decrease in efficiency from transmitting multiple packets (which increases the required bandwidth), in return for a somewhat increased latency where applicable (although not necessarily, as indicated below). Concatenation is possible only when all elements to be concatenated are available, which is likely to delay transmission of the elements first available.

It is nevertheless possible to generate the concatenation once for all elements. Thus the latency is only perceptible during the initial concatenation, and is not perceptible at all if the concatenation is done during a preliminary initialization phase (for example when the stream is saved on the server).

This embodiment generally requires modification of the streaming server, but does not require the ability to access the decryption keys for the stored video streams, which would be unacceptable in many cases.

Figure 3:
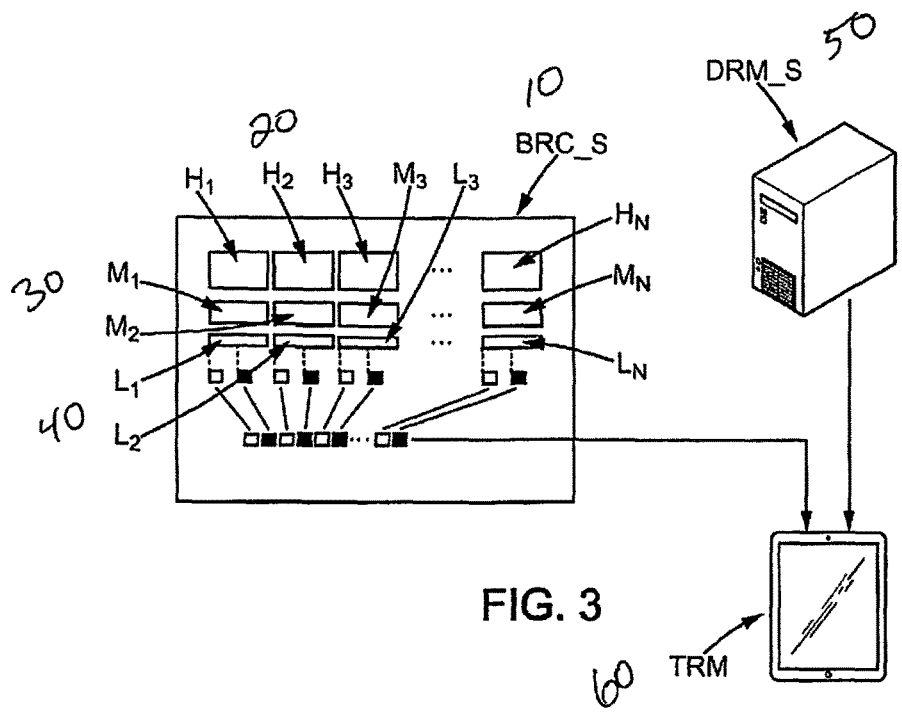

FIG. 3 represents an embodiment according to the invention in which a video streaming server BRC_S 10 stores a multitude of video streams, of which only one is represented. As in FIGS. 1 and 2, the represented video stream is stored in three versions: high resolution, medium resolution, and low resolution respectively.

Instead of transmitting only the beginning of each of the blocks 40 ($L_1, L_2, L_3 \ldots L_N$), the streaming server BRC_S 10 is arranged to identify an image in the middle of each encrypted block in order to transmit two images per encrypted block. By transmitting an image that is approximately in the middle of the encrypted block (in addition to the start image of the encrypted block), the method ensures that there is equal temporal distance between all images.

Locating an I image in the middle of the block (and more generally anywhere besides the beginning of the block) is a more complex task than extracting the first I image from the block. Indeed, the beginning of the first I image can be estimated with great accuracy since it is (generally) the first image of the block. But the further away we are from the beginning of the encrypted block, the greater the uncertainty as to the position of the successive images, as each is of variable size depending on the video stream in question.

It is nevertheless possible to estimate statistically a window within which the I image (or the two I images in the equal distance case) closest to the middle of the encrypted block (or another target position in the encrypted block) must necessarily be located. It is then possible to request transmission of all of this window in order to search for the I image in question (or one of the two I images in question, or the two I images in question). For example, it is possible to request transmission of a window (or subset) corresponding to 10% of the encrypted block, centered on the middle of the encrypted block (or any other relevant target position).

In some cases, it is possible to estimate analytically a window within which the I image (or the two I images in the equal distance case) closest to a given position in the encrypted block must necessarily be located. For example, in some encrypted video streams, the blocks are not encrypted in their entirety: a block header may be transmitted unencrypted (and contain more or less precise indications on the positions of the I images), or even certain unencrypted portions may be present in a block between encrypted elements, these unencrypted portions being, for example, I image markers.

However, according to one possible implementation, the blocks are fully encrypted (no portion of the video stream is transmitted without encryption—the entire video stream is encrypted) and the analytical method is not applicable.

This is advantageous in particular for video streams of about 10 to 20 minutes duration (and of course for shorter video streams as well), for which the extraction of only one image per block generally means extracting only about 100 images, which corresponds to a lower limit of what is needed for a satisfactory experience.

According to one possible implementation, instead of transmitting the beginning and the middle of each of the encrypted blocks $40$ ($L_1, L_2, L_3 \ldots L_N$) incrementally as they are requested, the streaming server BRC_S 10 groups these block beginnings and middles in a single packet that it transmits all at once. According to one possible implementation, in addition to concatenating the beginnings and middles of encrypted blocks, the streaming server BRC_S 10 adds metadata to the packet in order to help the terminal find each beginning and middle of the encrypted block concerned in the packet. Alternatively, the terminal TRM knows by their construction where the block beginnings and middles are located, without the need for metadata. For example, the block beginnings and middles may have a predefined size.

Figure 4:
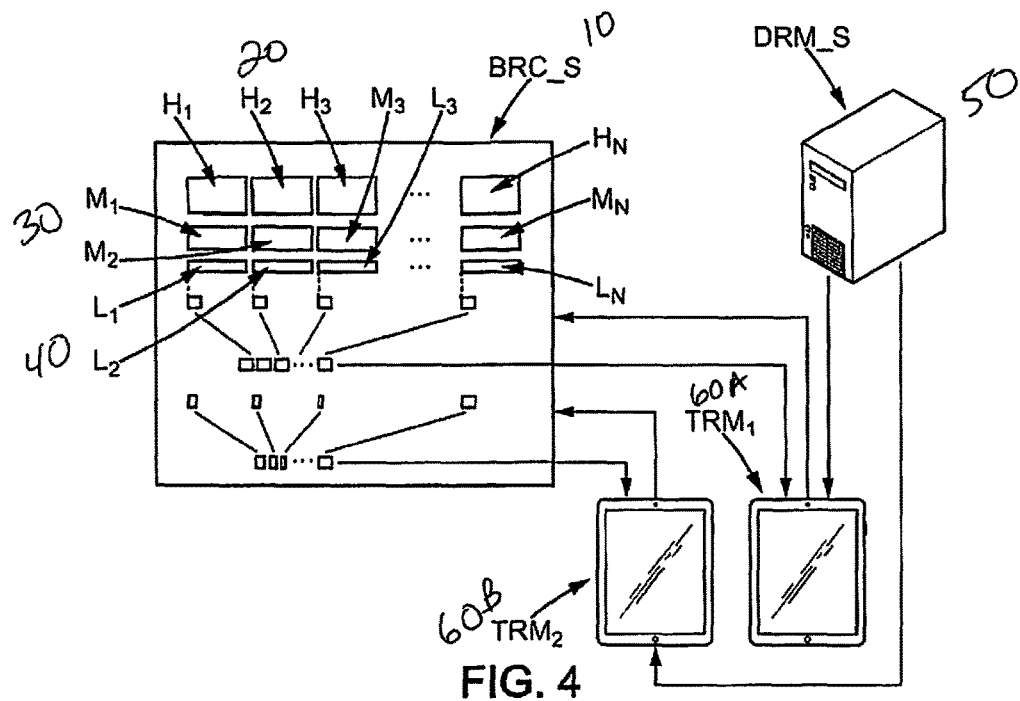

FIG. 4 represents an embodiment according to the invention in which a video streaming server BRC_S 10 stores a multitude of video streams, of which only one is represented. As in FIGS. 1 to 3, the represented video stream is stored in three versions: high resolution, medium resolution, and low resolution respectively.

The streaming server BRC_S 10 and the terminals that connect to it (in particular the represented terminals $TRM_1$ 60A, $TRM_2$ 60B) are arranged so that each terminal, by what can be termed a feedback loop, informs the streaming server BRC_S 10 of the size and position of the extracted images. Thus, once a terminal (terminal $TRM_1$ 60A_in FIG. 4) has decoded the beginnings of the encrypted blocks, it knows where each image starts and ends in each encrypted block beginning. It can therefore so inform the streaming server, which, the next time it has to transmit the images concerned, transmits only the encrypted block portions corresponding to these images. Thus, if an image occupies 2% of the block, and if initially 5% of the block is transmitted to ensure that the entire image is retrieved, the next time it is sufficient to transmit the 2% of the block which exactly corresponds to the image concerned. In this case, when terminal $TRM_2$ 60B requests the transmission of the same information as what terminal $TRM_1$ previously requested, the encrypted block beginnings are all shortened, apart from that of encrypted block $L_N$ (but this is specific to the video stream under consideration). The beginning of encrypted block $L_1$ is slightly shortened, that of encrypted block $L_2$ is a little more so, and that of encrypted block $L_3$ is much more so. In the example considered, that of encrypted block $L_N$ is found to have exactly the required size, and is therefore not shortened.

Figure 5:
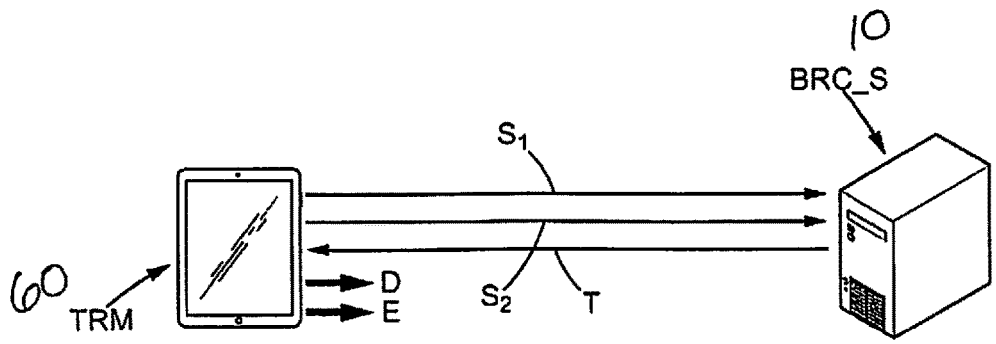
FIG. 5 represents a method according to an embodiment of the invention.

FIG. 5 represents a method according to one embodiment of the invention. More precisely, it illustrates steps $S_1$, $S_2$, T, D, and E of a method according to the first embodiment below.

Figure 6:
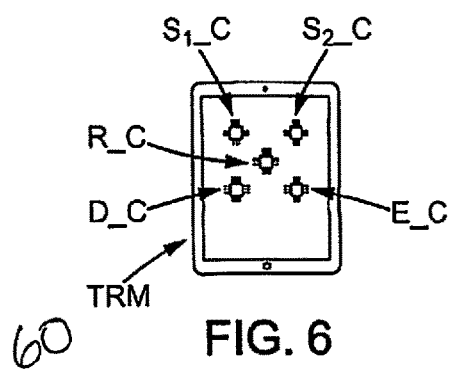
FIG. 6 represents a terminal according to an embodiment of the invention.

FIG. 6 represents a terminal according to one embodiment of the invention. It shows the circuits $S_1\_C$, $S_2\_C$, $R\_C$, $D\_C$, and $E\_C$ of the eleventh embodiment below. These circuits are actually not visible without opening the terminal.

Figure 7:
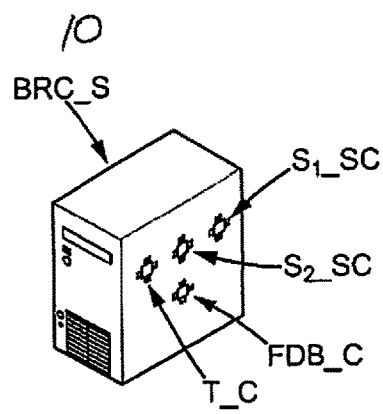
FIG. 7 represents a streaming server according to an embodiment of the invention.

FIG. 7 represents a streaming server according to one embodiment of the invention. It shows the circuits $S_1\_SC$, $S_2\_SC$, $T\_C$ of the twelfth embodiment below. It also illustrates a circuit FDB_C which makes it possible to receive information from terminals concerning the sizes of the images contained in the transmitted subsets, in order to transmit subsets of minimum size in the future. These circuits are actually not visible without opening the terminal.

A first embodiment relates to a method for the selective extraction, by a terminal (for example one of the terminals TRM, $TRM_1$ and $TRM_2$ represented in the figures), of at least one image to be extracted contained in an encrypted video stream stored on a server BRC_S. Server is understood to mean a physical server (as opposed to a purely software server). The server is unable to decrypt said encrypted video stream. For example, the relevant keys are not communicated to it for security reasons. Alternatively, this is simply due to a task distribution which does not give it decryption rights. According to one possible implementation, when several qualities of the same encrypted video stream are available, the lowest quality is selected. This reduces bandwidth requirements and does not present any noticeable disadvantage because, in the context of the method in question, low quality is acceptable in principle (since we are constructing an approximate representation of the video stream to facilitate navigating the video stream).

The encrypted video stream is divided into encrypted blocks $L_1$, $L_2$, $L_3$, $L_N$. Each encrypted block contains multiple encrypted images. "Contains multiple encrypted images" is understood to mean that the encrypted block comprises data which, after having been decrypted, are equal to a digital representation of said images. According to one possible implementation, the method is only intended to extract, for each encrypted block, strictly fewer images than the number of images contained in the encrypted block. According to one possible implementation, each block is encrypted in a conventional manner using a symmetric session key. This symmetric session key is, for example, a DES key, a 3DES key, an AES key, an RC5 key, etc. The session key is unknown to the streaming server BRC_S. This session key is, for example, calculated (or generated randomly) by a digital rights management server DRM_S. The digital rights management server DRM_S encrypts the session key, for example using an asymmetric encryption algorithm such as an RSA algorithm, an elliptic curve algorithm, and the like. The digital rights management server DRM_S then transmits this session key in encrypted form to the terminal TRM. Alternatively, the digital rights management server DRM_S transmits not the session key but elements enabling the terminal TRM to calculate the session key. Any other session key exchange mechanism is possible.

According to one possible implementation, the size of each video stream block is a multiple of an input block of the symmetric encryption algorithm used. For example, an AES session key works on 128-bit blocks, which is 16 bytes. Each video stream block can then have a size which is a multiple of 16 bytes. Alternatively, the encrypted block comprises additional metadata whose size is not a multiple of the size of the blocks used by the symmetric encryption algorithm used.

The method comprises a selection $S_1$ of an encrypted block $L_1$ (or even multiple encrypted blocks) of the encrypted video stream, said encrypted block containing an image to be extracted. According to one implementation, this selection is explicit (for example, the selection is made by indicating a sequence number of the encrypted block within the video stream in question). According to an alternative implementation, this selection is implicit. For example, by requesting from the server BRC_S a file containing information located in encrypted block $L_1$, the terminal can make an implicit selection of block $L_1$. According to one possible implementation, the selection (implicit or explicit) of the block is carried out by the terminal and communicated to the server. According to another possible implementation, the selection (implicit or explicit) of the block is carried out by the server.

The method comprises a selection $S_2$ of a subset of said encrypted block $L_1$ containing said image to be extracted. According to one implementation, this selection is explicit. According to an alternative implementation, this selection is implicit. For example, by requesting from the server BRC_S a file containing information located in the subset in question of the encrypted block $L_1$, the terminal can make an implicit selection of this subset of the encrypted block $L_1$. According to one possible implementation, the subset is defined by its size (expressed for example as a number of bytes). This information may be sufficient when the subset starts at the beginning of the encrypted block, or at a fixed position in the encrypted block. According to an alternative implementation, the subset is defined by its starting position (expressed for example as the number of bytes from the beginning of the encrypted block in question) and by its size (expressed for example as a number of bytes). According to an alternative implementation, the subset is defined by its starting position (expressed for example as the number of bytes from the beginning of the encrypted block in question) and by its end position (expressed for example as the number of bytes from the beginning of the encrypted block in question). According to one possible implementation, an explicit selection of the subset consists of transmitting from the terminal to the server the element(s) defining the subset concerned (for example its size and possibly its position). According to one possible implementation, selection (implicit or explicit) of the subset is carried out by the terminal and communicated to the server. According to another possible implementation, the selection (implicit or explicit) of the subset is carried out by the server.

The method comprises a transmission T of said subset, by the server to the terminal. According to one possible implementation, the terminal explicitly requests the transmission T. According to an alternative implementation, the transmission T is automatically performed by the server BRC_S.

The method comprises a decryption D of said subset by the terminal. To be able to decrypt, the terminal must know the encryption mode. The encryption of the blocks, regardless of the symmetrical algorithm used, is carried out for example in ECB mode (acronym corresponding to Electronic Code Book), or more frequently (because more secure) in CBC mode (acronym corresponding to Cipher Block Chaining). In ECB mode, each block of the encrypted block is encrypted independently of the others. Any block can therefore be decrypted if the encryption/decryption key is known. In the more secure CBC mode, each block of the encrypted block was encrypted by taking into account the block immediately preceding the encrypted block. To decrypt it, it is necessary to know the value of said block preceding the encrypted block. In order to perform the decryption D, it is therefore necessary, in the case of CBC mode, to obtain the 16 bytes (in the case of AES) immediately preceding the subset to be decrypted within the block in question, except for the very first block of the encrypted block (which can be decrypted autonomously). The subset therefore includes, where necessary, the previous 16 bytes (for AES), and more generally the number of bytes on which the symmetric encryption algorithm is used (if it is not AES).

The method comprises an extraction E from said decrypted subset, by the terminal, of said image to be extracted. Once the subset is decrypted the desired image needs to be extracted. This can be accomplished by attempting to decompress the file starting from the beginning of the decrypted subset. If this fails, it is necessary to restart by setting the beginning one byte further on, and so on until the decompression works. Alternatively, metadata indicate the beginning of the image.

According to a second embodiment, a method for selective extraction according to the first embodiment comprises, after the extraction of said image to be extracted from said decrypted subset, a transmission from the terminal to the server BRC_S of the size of the encrypted image to be extracted. According to a variant, a method for selective extraction according to the first embodiment comprises, after the extraction of said image to be extracted from said decrypted subset, a transmission from the terminal to the server BRC_S of the size of the encrypted image to be extracted as well as the position of this image (when this position is not known in advance or easy to deduce) within the encrypted block. The server BRC_S can then store the sizes and locations of the different images. When they are needed again, it is no longer necessary to transmit a subset of estimated size (usually much larger than it actually is to allow for a margin of error). It is possible to transmit a subset of the smallest possible size.

Alternatively, it is possible to install terminal emulator software on the streaming server BRC_C, in order to have access to the keys. It is then the server that updates itself by means of a terminal emulator.

According to a third embodiment, a method for selective extraction according to one of the first and second embodiments comprises a selection, by the terminal, of all encrypted blocks of the encrypted video stream. At least one image per encrypted block is then to be extracted from the stream.

According to a fourth embodiment, a method for selective extraction according to one of the first to third embodiments comprises a selection, for each selected encrypted block, of a single subset containing a single image to be extracted for said selected encrypted block. This is sufficient for video streams having a duration of at least 10-20 minutes, whereby a sufficient number of spaced-apart images is guaranteed. A single image is thus extracted per encrypted block.

According to a fifth embodiment, the single subset from a method for selective extraction according to the fourth embodiment, selected for a selected encrypted block, starts at the beginning of said selected encrypted block.

This is advantageous because one of the images of the encrypted block is easier to locate: the first one, as its position is generally known (the very beginning of the encrypted block) and only the size remains to be determined.

According to a sixth embodiment, the size of the subset selected by a terminal according to a method for selective extraction according to the fifth embodiment defaults to a predetermined size (for example 5% of the size of the selected block, or a constant size that is identical for all blocks of the stream).

According to one possible implementation, this predetermined size is constant and is equal to the maximum possible size of an encrypted image in the encrypted video stream. The maximum size, in bytes, of an encrypted image is the size of the unencrypted image, rounded to the nearest multiple (greater than or equal to) of the block size of the symmetric encryption algorithm used, plus one or two times the block size of the symmetric encryption algorithm used (one time in ECB mode, two times in CBC mode). For example, for an image with a maximum size of 200 bytes and a 16-byte encryption block size, the maximum size of the image is: 13*16+16+16=208+16+16=240 bytes (in CBC mode, if the image is not at the very beginning of the video stream).

However, the maximum size of an image can be very high, and can have a very low (even totally insignificant) probability of occurrence, which is often the case in practice.

According to one possible implementation, instead of using for the predetermined size a constant size equal to the maximum possible size of the encrypted image, a probable maximum size is used. For example, this can be the maximum size of a certain percentage (for example 99.95%) of the least resource-consuming (meaning smallest) images among the possible images. In the example considered, the size is therefore the size of the image having the largest size among the smallest 99.95% of the images. According to one possible implementation, assuming that an image corresponds to one of the most resource-consuming images (meaning, in the aforementioned example, one of the 0.05% images consuming the most resources), retransmission of a larger portion of the block is requested in order to obtain the entire image. According to one possible implementation, the percentage (for example the aforementioned 99.95%) is measured not only on the images of the stream concerned, but on the set of possible images. Thus, for very many streams, no image needs to be retransmitted due to a predetermined constant size that is too low.

According to one possible implementation, the size of the subset selected by a terminal according to a method for selective extraction according to the fifth embodiment defaults to a size that is set based on a characteristic of the selected block. The size may therefore be different from one block to another. For example, the size of the selected subset is set to a percentage of the size of the selected block (for example, 5% of the size of the selected block). According to one possible implementation, the size of the selected subset is set based on the quality of the stream segment contained in the block (which is another possible characteristic). Thus, if the quality leads to concluding that the block contains 240 images including 20 I images (for example one I image every half second, the block having for example a duration of ten seconds), and also to concluding that each I image should represent 2% of the block size on average, then one can extract 4% of the stream which guarantees extraction of an I image which could be up to twice the estimated average size of an I image of the block. This is only one possible example, of course.

In any case, this default value (predetermined size) may only apply when there is no size known in advance, received for example from another terminal that previously made a request concerning the same selected block (as envisaged in the second embodiment).

According to a seventh embodiment, each encrypted block selected in a method for selective extraction according to one of the first to third embodiments comprises only two images to be extracted. These may be the I image located at the beginning of the identified encrypted block and an I image from the middle of the encrypted block.

Advantageously, the extraction of a second image per block is only triggered for video streams with a total duration that is below a determined threshold (for example a threshold of between 10 and 20 minutes). According to one possible implementation, the method for selective extraction extracts three, four, or even five images per block. This can be useful for very short video streams (less than ten minutes, for example).

According to an eighth embodiment, a method for selective extraction according to one of the first to seventh embodiments comprises a concatenation, by the server, of multiple selected subsets, and a transmission of said concatenated subsets by the server to the terminal within a single packet. According to one possible implementation, the server is arranged to concatenate as many subsets as there is room for subsets in a packet of optimal size (for example a packet having the maximum size allowed on the communication network used). The MTU of an Ethernet 2 network is 1500 bytes (maximum size of the packet, at least without fragmentation), which is very short for the envisaged method. If there are more subsets than allowed by this implementation (the subsets do not all fit within a single packet), then it is advisable to divide the communication into multiple packets. Alternatively, it is possible to create a larger packet and rely on the fragmentation mechanisms of the network concerned. An IPv4 packet can only use up to 64K, which is once again rather short in the context of the envisaged method. However, other protocols allow for larger packets. For example, IPv6 allows very large packets (up to 4 GB) called "jumbograms".

According to a ninth embodiment, a computer program comprises a series of instructions which, when executed by at least one processor, implement a method according to one of the preceding embodiments. According to one possible implementation, this program is written for example in a low level language (such as an assembly language). It may also be written in a higher level language, such as the C language. This program may be separated into components stored on separate media. For example, one component may be stored on a mobile phone or on a personal computer, and one or more other component(s) may be stored on a streaming server. Each component may be written in a different language.

According to a tenth embodiment, non-transitory computer-readable storage media store a computer program according to the ninth embodiment. These media are, for example, rewritable memory (such as Flash memory or EEPROM) of a mobile telephone and/or memory of a computer server (for example hard disk magnetic memory).

According to an eleventh embodiment, a terminal TRM, $TRM_1$, $TRM_2$ is arranged for selective extraction of at least one image to be extracted contained in an encrypted video stream stored on a server BRC_S incapable of decrypting said encrypted video stream. The terminal is, for example, a mobile phone, a tablet, a laptop computer, a digital media player, etc. The encrypted video stream is divided into encrypted blocks $L_1$, $L_2$, $L_3$, $L_N$. Each encrypted block contains multiple encrypted images.

The terminal comprises an electronic circuit $S_1\_C$ for selecting an encrypted block from the encrypted video stream, said encrypted block containing an image to be extracted. According to one possible implementation, this electronic selection circuit is a dedicated electronic circuit, or an FPGA. According to another implementation, this electronic selection circuit is an association of a processor and memory storing a computer program adapted for implementing the functions of the electronic selection circuit, when executed by the processor. This electronic circuit may comprise a transmitter such as a network card or may be connected to such a transmitter.

The terminal comprises an electronic circuit $S_2\_C$ for selecting a subset of said encrypted block containing said image to be extracted. According to one possible implementation, this other electronic selection circuit is a dedicated electronic circuit, or an FPGA. According to another implementation, this other electronic selection circuit is an association of a processor and memory storing a computer program adapted for implementing the functions of the electronic selection circuit, when executed by the processor. This electronic circuit may comprise a transmitter such as a network card or may be connected to such a transmitter.

The terminal comprises an electronic circuit R_C for receiving said subset from the server. According to one possible implementation, this electronic reception circuit is a dedicated electronic circuit, or an FPGA. According to another implementation, this electronic reception circuit is an association of a processor and memory storing a computer program adapted for implementing the functions of the electronic reception circuit, when executed by the processor. This electronic circuit may comprise a receiver such as a network card or may be connected to such a receiver.

The terminal comprises an electronic circuit D_C for decrypting the selected subset. According to one possible implementation, this electronic decryption circuit is a dedicated electronic circuit, or an FPGA. According to another implementation, this electronic decryption circuit is an association of a processor and memory storing a computer program adapted for implementing the functions of the electronic decryption circuit, when executed by the processor.

The terminal comprises an electronic circuit E_C for extracting said image to be extracted from said decrypted subset. According to another implementation, this electronic extraction circuit is an association of a processor and memory storing a computer program adapted for implementing the functions of the electronic extraction circuit, when executed by the processor. The extraction may consist of attempting to decompress the decrypted data, and as long as the decompression fails, reattempting the decompression by starting one byte further on in the decrypted data.

According to one possible implementation, the five preceding electronic circuits ($S_1\_C$, $S_2\_C$, $R\_C$, $D\_C$, $E\_C$) are five distinct circuits. According to another implementation, there are five circuits comprising a processor shared between the five circuits.

According to a twelfth embodiment, a server BRC_S is arranged to store an encrypted video stream that it is not able to decrypt. The encrypted video stream is divided into encrypted blocks ($L_1$, $L_2$, $L_3$, $L_N$). Each encrypted block contains several encrypted images. The server comprises an electronic circuit $S_1\_SC$ for selecting an encrypted block from the encrypted video stream, said encrypted block containing an image to be extracted. According to one implementation, this electronic selection circuit is designed to cooperate with a terminal electronic selection circuit, which sends it a selection order to be implemented. According to one possible implementation, this electronic selection circuit is a dedicated electronic circuit, or an FPGA. According to another implementation, this other electronic selection circuit is an association of a processor and memory storing a computer program adapted for implementing the functions of the electronic selection circuit, when executed by the processor. This electronic circuit may comprise a receiver such as a network card or may be connected to such a receiver.

The server comprises an electronic circuit $S_2\_SC$ for selecting a subset of said encrypted block containing said image to be extracted. According to one implementation, this other electronic selection circuit is designed to cooperate with a terminal electronic selection circuit, which sends it a selection order to be implemented. According to one possible implementation, this other electronic selection circuit is a dedicated electronic circuit, or an FPGA. According to another implementation, this other electronic selection circuit is an association of a processor and memory storing a computer program adapted for implementing the functions of the electronic selection circuit, when executed by the processor. This electronic circuit may comprise a receiver such as a network card or may be connected to such a transmitter.

The server comprises an electronic circuit T_C for transmitting said subset to a terminal.

According to one possible implementation, the three preceding electronic circuits ($S_1\_SC$, $S_2\_SC$, $T\_C$) are three distinct circuits. According to another implementation, there are three circuits comprising a processor shared between the three circuits.

According to one possible embodiment, a video stream distribution system comprises a terminal according to the eleventh embodiment and a server according to the twelfth embodiment.

The invention is not limited to the embodiments described above by way of example. The memories that can be used cover any type of memory.

The embodiments described in relation to the method according to embodiments of the invention can be transposed to the terminals and/or to the server BRC_S according to embodiments of the invention, as well as to the computer programs and program storage media according to embodiments of the invention, and vice versa.

The invention claimed is:

1. A method for the selective extraction, by a terminal, of at least one image to be extracted from an encrypted video stream, wherein
multiple encrypted versions of said encrypted video stream being stored on a server incapable of decrypting said encrypted versions of the video stream,
said multiple encrypted versions comprising at least a low resolution version and a high resolution version,
each encrypted version of said encrypted video stream being divided into encrypted blocks, each encrypted block containing a multiple of encrypted images, said method comprising:
selecting an encrypted block of the low resolution encrypted version of the encrypted video stream, said encrypted block containing an image to be extracted;
selecting a subset of said encrypted block containing said image to be extracted, wherein the subset starts at a beginning of the encrypted block and has a size strictly greater than the size of the image to be extracted;
transmitting, by the server to the terminal, said subset;
decrypting said subset by the terminal; and
extracting by the terminal, said image to be extracted, from said decrypted subset.

2. A method for selective extraction according to claim 1, comprising, after extraction of said image to be extracted from said decrypted subset, transmitting from the terminal to the server a size of the encrypted image to be extracted.

3. The method for selective extraction according to claim 1, comprising a selection, by the terminal, of all the encrypted blocks of said low resolution encrypted version of the video stream.

4. The method for selective extraction according to claim 1, comprising a selection, for each selected encrypted block, of a single subset containing a single image to be extracted for said selected encrypted block.

5. The method for selective extraction according to claim 1, wherein each selected encrypted block comprises only two images to be extracted.

6. The method for selective extraction according to claim 1, comprising a concatenation, by the server, of multiple selected subsets, and a transmission of said concatenated subsets by the server to the terminal within a single packet.

7. A non-transitory computer-readable storage medium, storing a computer program comprising program instructions, the computer program able to be loaded into a data processing unit and adapted for causing the data processing unit to implement a method for selective extraction, by a terminal, of at least one image to be extracted contained in an encrypted video stream,
wherein multiple encrypted versions of said encrypted video stream are stored on a server incapable of decrypting said encrypted versions of the video stream,
said multiple encrypted versions comprising at least a low resolution version and a high resolution version,
each encrypted version of said encrypted video stream being divided into encrypted blocks, each encrypted block containing multiple encrypted images, said method comprising:
selecting of an encrypted block of the low resolution encrypted version of the encrypted video stream, said encrypted block containing an image to be extracted;
selecting of a subset of said encrypted block containing said image to be extracted, wherein the subset starts at a beginning of the encrypted block and has a size strictly greater than the size of the image to be extracted;
transmitting, by the server to the terminal, of said subset;
decryption of said subset by the terminal;
extracting, by the terminal, of said image to be extracted, from said decrypted subset.

8. A terminal arranged for selective extraction of at least one image to be extracted contained in an encrypted video stream, wherein
multiple encrypted versions of said encrypted video stream being stored on a server incapable of decrypting said encrypted versions of the video stream,
said multiple encrypted versions of said encrypted video stream comprising at least a low resolution version and a high resolution version,
each encrypted version of said encrypted video stream being divided into encrypted blocks, each encrypted block containing multiple encrypted images, said terminal comprising:
an electronic circuit for selecting an encrypted block of the low resolution encrypted version of the video stream, said encrypted block containing at least one image to be extracted;
an electronic circuit for selecting a subset of said encrypted block containing said image to be extracted, wherein the subset starts at a beginning of the encrypted block and has a size strictly greater than the size of the image to be extracted;
an electronic circuit for receiving said subset from the server;
an electronic circuit for decrypting said subset;
an electronic circuit for extracting said image to be extracted from said decrypted subset.

9. A server arranged for storing multiple encrypted versions of an encrypted video stream, said server not being able to decrypt said encrypted versions of said encrypted video stream,
said multiple encrypted versions of said encrypted video stream comprising at least a low resolution version and a high resolution version,
each encrypted version of the video stream being divided into encrypted blocks, each encrypted block containing multiple encrypted images, said server comprising:
an electronic circuit for selecting an encrypted block from the low resolution encrypted version of the encrypted video stream, said encrypted block containing an image to be extracted;
an electronic circuit for selecting a subset of said encrypted block containing said image to be extracted, wherein the subset starts at a beginning of the encrypted block and has a size strictly greater than the size of the image to be extracted;
an electronic circuit for transmitting said subset to a terminal.

* * * * *